Dec. 21, 1954     O. B. WHITAKER     2,697,827
COMBINED P.P.I. PRESENTATION
Filed Aug. 6, 1948     2 Sheets-Sheet 1
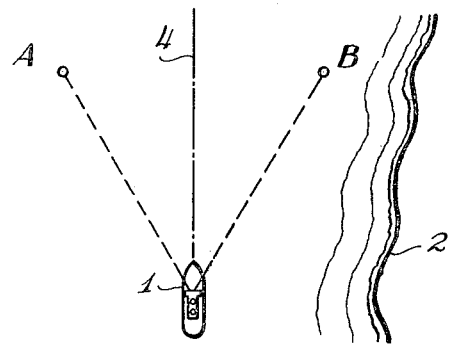
Fig. 1.
| Fig. 2. | Fig. 3. | Fig. 4. |
|---|---|---|
| SHIP'S HEADING / TRUE PRESENTATION | RELATIVE PRESENTATION | COMBINED PRESENTATION |
0°
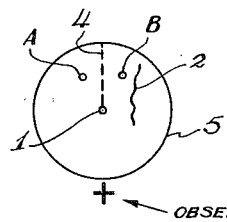 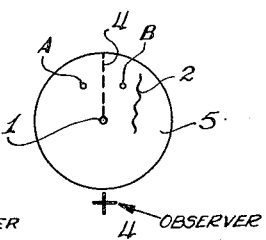 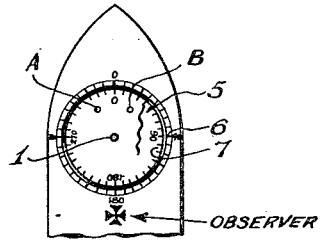
90°
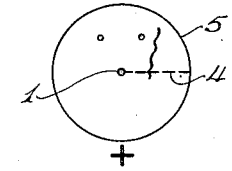 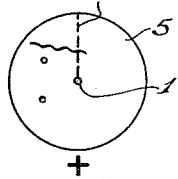 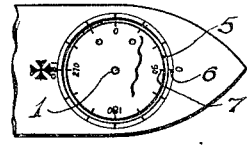
180°
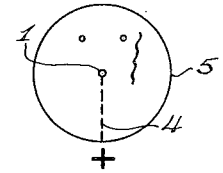 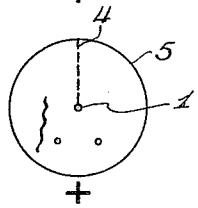 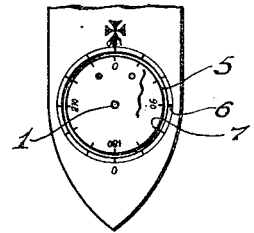
270°
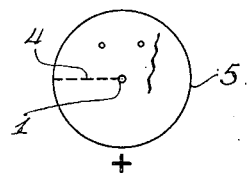 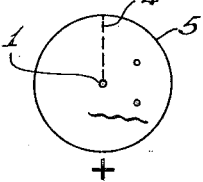 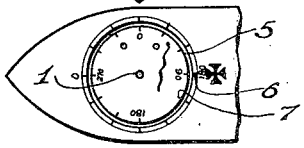
INVENTOR
OMAR B. WHITAKER
BY Herbert H. Thompson
HIS ATTORNEY Dec. 21, 1954　　　O. B. WHITAKER　　　2,697,827
COMBINED P.P.I. PRESENTATION Filed Aug. 6, 1948　　　　　　　　　　　　　2 Sheets—Sheet 2

INVENTOR
OMAR B. WHITAKER
BY
Herbert
HIS ATTORNEY

United States Patent Office 2,697,827
Patented Dec. 21, 1954

2,697,827

COMBINED P. P. I. PRESENTATION

Omar B. Whitaker, Great Neck, N. Y., assignor to The Sperry Corporation, a corporation of Delaware Application August 6, 1948, Serial No. 42,807

5 Claims. (Cl. 343—10)

This invention relates to visual indicators such as those used with radar, and more particularly to means for improving visual data presentation by stabilizing the indicators in azimuth.

Visual data presentation is one of the most important aspects of radar, sonar and other object detecting and navigation systems. A primary purpose of good data presentation is to reduce mental interpretations by the operator, and make the presentation as automatic, simple and foolproof as possible.

Present radar indicators of the plan position (P. P. I.) type for use on ships and other dirigible craft, generally have two optional modes of presentation, True and Relative. In True presentation the top of the cathode ray tube picture is always due North, and a ship's heading flasher is provided which is aligned to an angle indicating the ship's heading. A disadvantage of this True type presentation is that the radar picture is not in physical alignment with the actual eye-view as seen from the pilot house, unless of course, the heading is due North. In other words, a mental step is required for the operator to correctly interpret this presentation.

In Relative presentation the direction of the ship's heading always appears at the top of the tube. Disadvantages of this type presentation are that the True bearing of reflecting objects ("targets") is not available without computation, and also that the picture moves on the screen when the ship's heading changes thereby having a tendency to "fuzz" or blur the picture, especially if the ship is yawing appreciably.

There is also the additional possibility of error as to which type presentation is being shown, i. e., whether the selector switch is in True or Relative position.

The present invention combines the desirable features of both the True and Relative modes of presentation which are in present use, in a single presentation, and eliminates many of the possible sources of error in interpretation. This is done by making the visual indicator, i. e., the cathode ray tube, rotatable, stabilizing it in azimuth, and providing an additional bearing scale on the tube face or on the frame supporting the tube.

The Combined presentation of the present invention provides a picture in continuous physical alignment with the eye-view from the pilot house, which picture does not rotate relative to the tube, thereby eliminating the fuzzing or blurring of the picture. This indicator also provides True and Relative bearings of targets, and the ship's heading continually and automatically, without mental arithmetic by the operator. All of this information is available simultaneously on one indicator so that the operator need not even move his head. The necessity of providing an auxiliary compass repeater for the radar operator, which is standard practice in some installations, is eliminated.

Accordingly a principal object of the invention is to present an improved form of radar data presentation.

Another object of the invention is to provide a P. P. I. presentation combining the best features of the present modes of operation and eliminating their disadvantages.

Another object of the invention is to provide a picture which is in continuous physical alignment with the actual picture as seen by the human eye from the pilot house, together with True and Relative bearing information and ship's heading information on the face of a single instrument.

Another object of the invention is to eliminate possible sources of human error in the interpretation of the radar data presentation by eliminating mental operations by the operator.

Another object of the invention is to provide True and Relative bearing target information with a single mode of presentation and on a single instrument.

These and other objects will be apparent from the following detailed specification and drawings of which;

Fig. 1 is an illustrative map;

Figs. 2, 3 and 4 are cathode ray tube representations illustrative of the invention.

Figure 5:
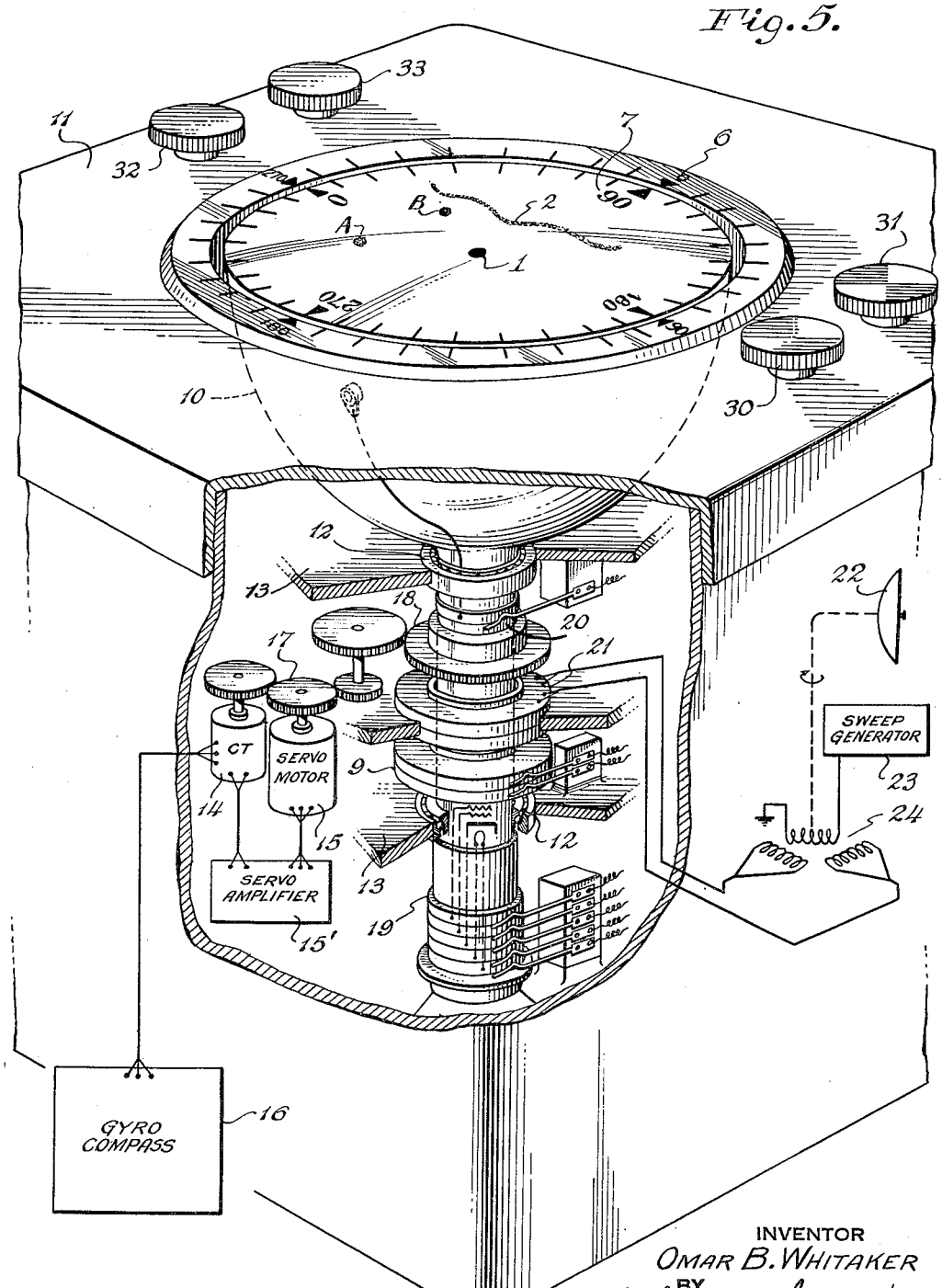
Fig. 5 is a preferred embodiment of the invention.

Fig. 1 illustrates a typical map showing the ship 1, shore line 2, and obstacles, buoys or targets A and B. The direction of True North is indicated by the arrow 3.

Figs. 2, 3 and 4 illustrate the differences between the presently used True and Relative presentations, and the "Combined" presentation of this invention, as the ship's heading changes.

Fig. 2 illustrates the True presentation where the top of the picture is always due North regardless of the ship's heading. The heading flasher 4 rotates in alignment with the ship's heading. The True presentation is not physically aligned with the actual eye-view as seen from the pilot house, as may be seen. For instance, when the craft heading is 180°, it may possibly appear to an unskilled observer that the ship is heading toward obstacles A and B appearing near the top of the tube 5, whereas, it is actually heading away from them. It is necessary for the operator to mentally reorient the picture, and in an emergency, he might omit this mental step.

Fig. 3 illustrates the optional Relative presentation which is also in present use. In this position the direction of the ship's heading always appears at the top of the tube. Therefore, as the ship's heading changes it is seen that the picture rotates relative to the face of the tube. This is done by maintaining the radial sweep deflection in the cathode ray tube always parallel to the directivity axis of antenna 22. In the Relative type presentation the True bearing of targets is not immediately available without computation and observation of a compass, and also the picture moves on the screen thereby having a tendency to blur or fuzz.

Fig. 4 illustrates the Combined presentation of the present invention. In this system the cathode ray tube 5 is adapted to be rotated relative to the case of the instrument upon which is mounted the fixed scale 6, the zero position of which is parallel to the keel of the ship. It will be seen that as the heading of the ship changes, the picture rotates as in the previously described Relative position. However, there will be no blurring of the picture because it is the actual tube which rotates, and not the picture relative to the tube face. It will be seen that the Combined presentation always presents the picture in physical alignment with the eye-view from the pilot house thereby avoiding any possibility of misinterpretation.

There is also a second circular scale 7 on the face of, or attached to the tube 5. Relative bearings of targets are read immediately from the outer scale 6 which is fixed with relation to the ship, and the True bearing of targets is read from the scale 7 on the tube face. This tube scale may be painted or etched on the tube face, or it may be carried by a ring clamped onto the tube, or it may be a separate, transparent compass repeater card.

It will also be seen that the ship's heading may be read on the tube scale 7 against the zero position of the fixed scale. For instance, when the ship's heading is 90°, a reading of 90° may be read by observing the tube scale opposite the zero position of the fixed scale 6.

Therefore, it is seen that the Combined presentation of the present invention, has all the advantages of the two existing modes of presentation and eliminates some of their disadvantages. All the information available on the two prior modes of operation is available in this single Combined representation, thereby removing any possibility of a mistake as to whether the indicator selector switch is in the True or Relative position.

Fig. 5 illustrates how the Combined presentation may be obtained. The tube 10 is mounted for rotation by means of bearings 12 each of which is fixed to the tube and is adapted to rotate on bearing rings 13 which are fixed to the case 11. The tube is rotated by the servo system comprising motor 15, amplifier 15' and control transformer 14, which moves the tube in response to signals from the ship's gyro compass 16 through gears 17 and 18. Alternatively the servo system comprising control transformer 14, servo amplifier 15' and servo-motor 15 may be replaced by a simple selsyn or step by step motor to drive the cathode ray tube 10 directly. The tube 10 is light in weight and it may be mounted on suitable bearings so that the load may be handled by a straight selsyn or step by step motor drive.

The electrical connections from the tube socket are brought out through slip ring adapter 19 and the high voltage connection is brought out through slip ring 20. The deflection coils 21 are fixed to the case 11 so that the tube rotates with respect to them, rather than having them rotate with respect to the tube, as is done in the presently used True presentation. Focus coil 9 is adapted to be adjustably mounted with respect to tube 10, as by means of knob 30. Other knobs 31, 32 and 33 may be provided for synchronizing the compass card 7 initially with the gyro compass, for adjusting the tuning of the radio circuit and for adjusting the brightness of the image, etc.

While in the foregoing I have referred to the cathode ray tube and its compass card 7 as the rotatable element, if the apparatus is viewed from a remote point off the ship, it is the cathode ray tube which is stabilized or is fixed in azimuth, while it is the ship which turns the ring 6 and deflecting coil 21 around the cathode ray tube 10 and scale 7 as the ship turns.

The rotating sweep voltages for the tube are provided by sweep generator 23. The output of generator 23 is resolved into two components differing 90° in phase, by the two-phase resolver 24, the rotor of which is linked to antenna 22. These two voltages are fed to the deflection coils thereby providing an electrical field which rotates in synchronism with antenna 22. Details of this type P. P. I. deflection circuit may be obtained on page 534, of the book "Radar System Engineering" by L. Ridenour, published 1948 by McGraw-Hill.

Alternatively, the rotating sweep may be obtained mechanically by mounting the deflection coils 21 for rotation about the axis of the cathode ray tube 10, and driving it synchronously with the rotation of the antenna 22. This construction is a well known alternative to that shown in Fig. 5, and therefore is not shown in the drawings. My invention is equally applicable to either alternative.

To conclude, it will be seen that the Combined presentation of the invention provides all the necessary information with a minimum of possibility of error in its use.

The invention is not limited to radar or sonar systems but may be used wherever it is necessary to stabilize a cathode ray tube, or other indicator, with a stable reference. The invention has been shown with the indicator stabilized about one axis, but it is not so limited as the same technique may be used to stabilize it about other axes if desirable.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Craft radar means adapted to present a polar coordinate presentation comprising a cathode ray tube rotatable with respect to the craft, means to prevent smearing of the presentation indications, including rotation means connected to stabilize said cathode ray tube in azimuth, an antenna rotatable with respect to the craft, means to provide sweep voltages in said tube rotatable in synchronism with said antenna rotation, and means to maintain the presentation in continuous alignment with the visual view over said craft bow comprising a gyro compass and servomotor means responsive to said compass to rotate said cathode ray tube proportionally to craft heading.

2. Craft navigation means comprising a radar antenna, a cathode ray tube radar indicator of the plan position relative bearing type, a rotatable mounting for said cathode ray tube, a compass, means responsive to said compass to rotate said cathode ray tube proportionally to craft heading, and rotary transformer means connecting said radar antenna and said indicator to provide said plan position indication in continuous alignment with the actual eye view over said craft bow.

3. A craft radar antenna, a cathode ray tube, means connecting said antenna and said cathode ray tube to provide a presentation of surrounding objects in physical alignment with the eye view over the craft bow, means to prevent smearing of said presentation including a compass, means to rotatably mount said cathode ray tube, and servo means connecting said compass and said rotatable mounting means to rotate said cathode ray tube proportionally to craft heading.

4. In a craft navigation system, a rotatable radar antenna, a cathode ray tube radar indicator, rotary transformer means mechanically connected to said antenna, deflection coil means for said cathode ray indicator connected to the output of said rotary transformer means to provide a plan position indication of the relative type on said cathode ray indicator, a compass, means to rotatably mount the said cathode ray tube relative to said deflection coil means and servo means connected to said compass and said rotating means to rotate said cathode ray tube proportionally to craft heading to thereby provide a cathode ray tube plan position indication which is in continuous alignment with the eye view over the craft bow and which is not subject to smearing as the craft turns.

5. In a craft navigation system, a rotatable radar antenna, a cathode ray tube radar indicator, means to provide on said cathode ray tube a combined plan position indication which is in continuous alignment with the eye view over the craft bow and which is not subject to smearing as the craft turns comprising rotary transformer means mechanically connected to said antenna, deflection coil means for said cathode ray indicator connected to the output of said rotary transformer means to provide a plan position indication of the relative type of said cathode ray indicator, a compass, means to rotate the said cathode ray tube relative to said deflection coil means and servo means connected to said compass and said rotating means to rotate said cathode ray tube proportionally to craft heading.

References Cited in the file of this patent

UNITED STATES PATENTS

| Number | Name | Date |
| --- | --- | --- |
| 2,209,191 | Dearing | July 23, 1940 |
| 2,264,279 | Dearing | Dec. 2, 1941 |
| 2,307,029 | Elm | Jan. 5, 1943 |
| 2,364,731 | Luck | Dec. 12, 1944 |
| 2,400,232 | Hall | May 14, 1946 |
| 2,403,996 | Potter | July 16, 1946 |
| 2,408,848 | Hammond | Oct. 8, 1946 |
| 2,417,086 | Proskauer | Mar. 11, 1947 |
| 2,426,217 | Hoisington | Aug. 26, 1947 |
| 2,463,529 | Ferrill | Mar. 8, 1949 |
| 2,480,208 | Alvarez | Aug. 30, 1949 |
| 2,573,021 | Higinbotham | Oct. 30, 1951 |

FOREIGN PATENTS

| Number | Country | Date |
| --- | --- | --- |
| 591,322 | Great Britain | Aug. 19, 1947 |

OTHER REFERENCES

Principles of Radar, M. I. T. Radar School Staff 2nd ed. Declassified March 15, 1946; pages 3–53 to 3–69.